United States Patent [19]

Lupke

[11] Patent Number: 5,324,557
[45] Date of Patent: Jun. 28, 1994

[54] MULTI-SKIN ANNULARLY RIBBED TUBE

[76] Inventor: Manfred A. A. Lupke, 10 McLeary Court, Concord, Ontario, Canada, L4K 2Z3

[21] Appl. No.: 921,943

[22] Filed: Jul. 30, 1992

Related U.S. Application Data

[63] Continuation-in-part of Ser. No. 711,037, Jun. 6, 1991, abandoned.

[51] Int. Cl.[5] ............................................... B27N 5/02
[52] U.S. Cl. ........................... 428/36.5; 428/36.9; 428/36.91; 428/158; 428/163; 138/121; 138/149; 138/DIG. 9
[58] Field of Search ............... 428/36.9, 36.92, 156, 428/158, 163, 318.4, 318.6, 318.8, 319.3, 319.7, 319.9, 36.5; 138/121, 149, DIG. 9

[56] References Cited

U.S. PATENT DOCUMENTS

| | | | |
|---|---|---|---|
| 3,858,615 | 1/1975 | Weigl | 138/121 |
| 4,226,580 | 10/1980 | Lupke | 425/504 |
| 4,305,703 | 12/1981 | Lupke | 425/72.1 |
| 4,312,383 | 1/1982 | Kleykamp | 138/103 |
| 4,500,284 | 2/1985 | Lupke | 425/511 |
| 4,510,013 | 4/1985 | Lupke | 156/498 |
| 4,534,923 | 8/1985 | Lupke | 264/156 |
| 4,575,400 | 3/1986 | Ueda et al. | 156/128 |
| 4,789,589 | 12/1988 | Baxter | 264/45.9 |
| 5,048,572 | 9/1991 | Levine | 138/121 |

FOREIGN PATENT DOCUMENTS

| | | |
|---|---|---|
| 2042031 | 5/1972 | Fed. Rep. of Germany . |
| 2803708 | 8/1979 | Fed. Rep. of Germany . |
| 9031028 | 10/1979 | Japan . |

*Primary Examiner*—Ellis P. Robinson
*Assistant Examiner*—Michael A. Williamson
*Attorney, Agent, or Firm*—Beveridge, DeGrandi, Weilacher & Young

[57] ABSTRACT

Annularly ribbed tube comprises one or more coaxial co-extruded inner layers and a coaxial outer layer of thermoplastic material. The tube has sharply upstanding annular or helical ribs having a width which is small in comparison to distance between annular ribs or between turns of the helix. At least one of the inner layers of extrudate fills a hollow outer shell of each rib which is formed by the outer layer. An innermost layer may be a smooth inner skin or may have a smooth inner wall and another wall which bulges into the rib cavity.

8 Claims, 5 Drawing Sheets

FIG. 2
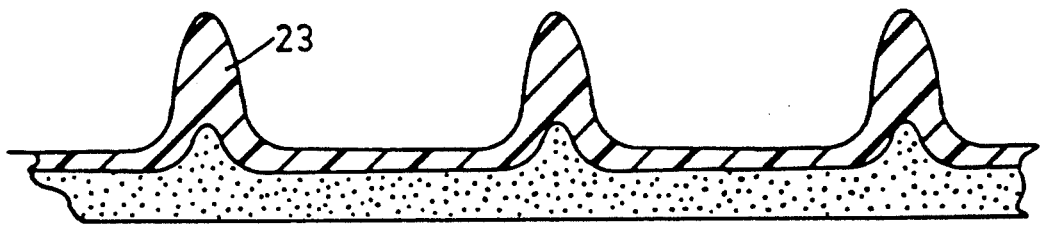
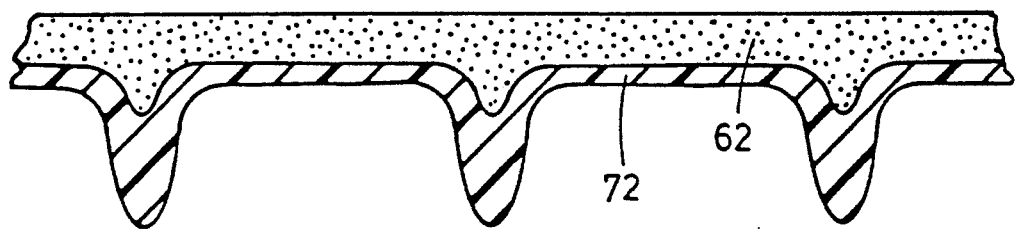
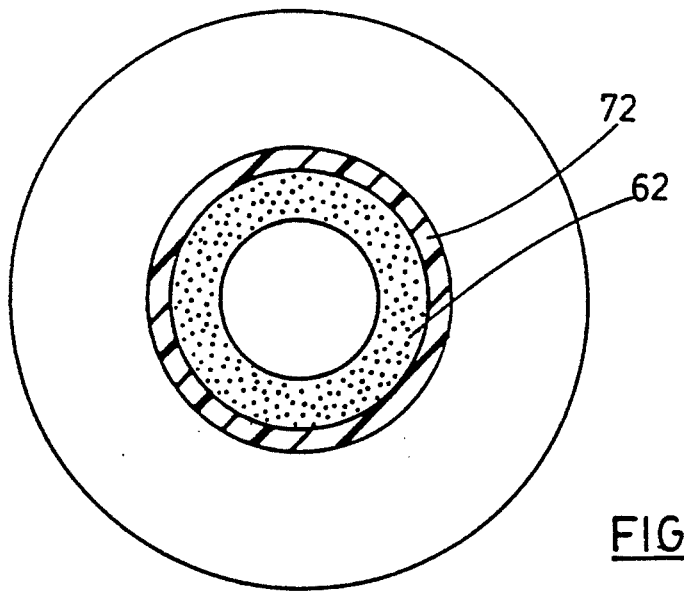
FIG. 3

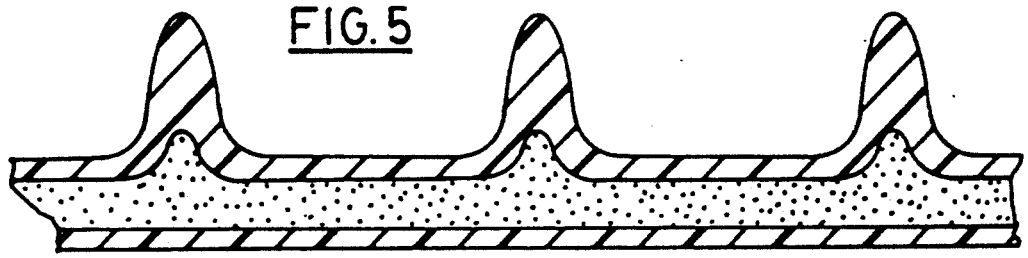
FIG. 5
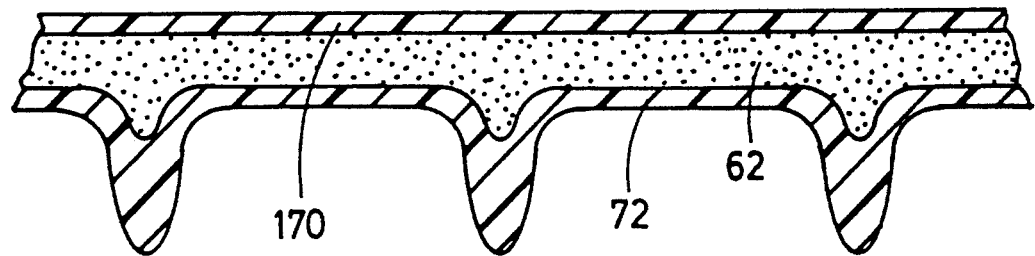
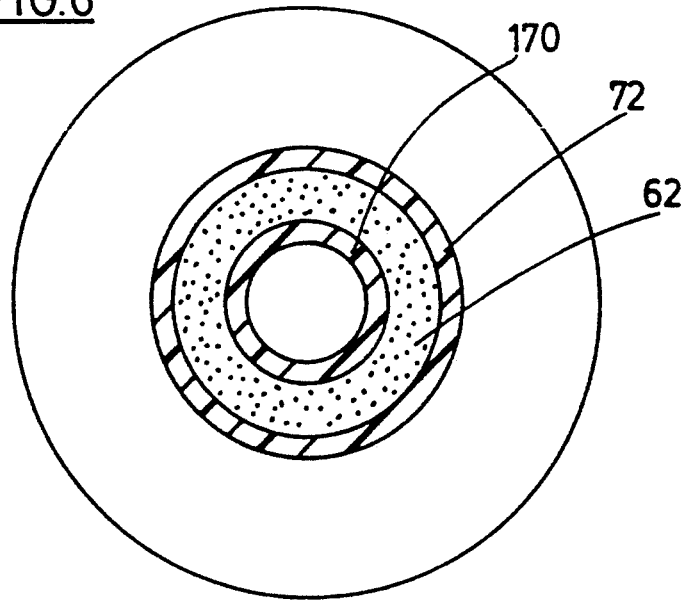
FIG. 6

MULTI-SKIN ANNULARLY RIBBED TUBE

RELATED APPLICATIONS

This is a continuation-in-part of U.S. patent application Ser. No. 07/711037 filed Jun. 6, 1991 which is abandoned as of the filing of this application.

BACKGROUND OF THE INVENTION

1. Field of the Invention

This invention relates to annularly ribbed tube and to a method and apparatus for its production.

2. Background of the Invention

It has become conventional to use corrugated tube, possibly double-walled corrugated tube, or annularly ribbed tube for thermoplastic, semi-rigid tubing frequently used as drainage conduit for underground use, or for carrying electrical cables. A corrugated or double-walled corrugated tube has some advantages and annular ribbed tube has other advantages. For example, corrugated tube, whether or not double-walled, tends to be of lighter construction than ribbed tube. It may be made by blow molding techniques which do not require such high extrusion pressures as do the injection molding techniques which are required for ribbed tube. On the other hand, corrugated tube is not as sturdy as ribbed tube and, when it is double-walled, special provisions must be made to allow for equalization of pressure within the closed corrugated envelopes between the tube walls so that these have no tendency to collapse. Various other considerations, possible specific to the intended use, apply to the choice of ribbed or corrugated tube.

The techniques necessary for the production of double-walled corrugated tube are quite well known in this field. For example, extrusion nozzles having coaxial extrusion orifices for extruding annual parisons to form each of the walls are known from U.S. Pat. No. 4,226,580 (Lupke) issued October 1980, 30 U.S. Pat. No. 4,305,703 (Lupke) issued December 1981, U.S. Pat. No. 4,500,284 (Lupke) issued February 1985, U.S. Pat. No. 4,510,013 (Lupke) issued April 1985, and U.S. Pat. No. 4,534,923 (Lupke) issued August 1985.

The Patents quoted above are merely exemplary of a large number of patents in this field.

Ribbed tube differs from corrugated tube by its greater rigidity which is, inter alia influenced by the longitudinal spacing of annular or helical ribs which upstand relatively sharply from an outer tube surface, at least in comparison to the smooth waves of corrugated tube. The tube wall, including the ribs, is generally relatively dense and the tube is, therefore, heavy.

The thickness of the ribs in the longitudinal direction of the tube may be small in comparison with the distance of tube between each rib. Tube between each rib may be profiled with patterning in the form of embossed or otherwise formed annular ridges or other patterns. Such patterns are not to be confused with the sharply upstanding ribs to which the invention relates. The ribs typically, although not necessarily, upstand from the surface of the tube by at least a height equal to the tube wall radial thickness. Possibly, the rib height is as much as five times or more the radial tube thickness.

As a result of the difference in structure between ribbed tube and corrugated tube, the molding techniques in forming ribbed tube are more akin to injection molding techniques than to the blow molding used for the outer skin of double walled corrugated pipe due to the extrusion pressure necessary to force plastic extrudate into the grooves to mold the ribs of the pipe. Thus, although, filled corrugations have been contemplated in the past (see German Offenlegunschrift 2,042,031), it has not been thought possible to provide ribbed pipe except as a single continuous injection extrusion.

German Offenlegunschrift 2,042,031 discloses a blow molding technique in which an outer corrugated wall is produced in a conventional manner. Downstream of this, again in a somewhat conventional manner an inner smooth wall is imposed within the corrugated wall. The German document discloses foaming the inner wall so that the extrudate expands to fill the corrugations in addition to forming the inner wall. Ribbed tube could not be produced in this manner.

Although ribbed tube as previously known is somewhat heavy and extravagant in raw material, its advantages in rigidity and strength are considerable. While considerable effort has been applied to the problem of proper penetration of the rib forming grooves by the extrudate, the problem of undue usage of plastic extrudate appears to have been regarded as insoluble.

The present invention has addressed the problem of providing a ribbed tube which is (1) lighter than previously thought possible, (2) less extravagant in materials, (3) may incorporate recycled material and (4) is of comparable quality to conventional ribbed tube.

SUMMARY OF THE INVENTION

Surprisingly, it has been found possible to devise a method for the production of multi-layer ribbed tube which may alleviate the above referred to problem. Thus, according to the invention, there is provided semi-rigid, thermoplastic multi-layer tubing having external structural ribs extending therearound, and a smooth inner surface, the ribs being sharply upstanding from an outer surface of the tube and being spaced apart by a distance greater than their widest width, each rib comprising on outer layer of thermoplastic material and an inner layer of thermoplastic material of lower density.

There may suitably be two or more coaxial layers, i.e. an outer layer and at least one inner layer. Suitably, the inner layer or layers may be of lower density thermoplastic material than that of the outer layer. The inner layers may be made of recycled material. The inner layer or layers may extend partially into the ribs to form an inner core thereof or the inner layer may be substantially smooth walled on both its inner and outer surfaces. The inner layer should bond firmly with the outer layer to form a robust composite tube.

When more than two layers are present, the third or further layer may be extruded through a further coincident or staggered, coaxial, annular extrusion port or it may be foamed from the second layer. For example, when the second layer is formed it may be possible to form an innermost third layer of non-foamed second layer due to interaction of the foam at the surface of the plug or with air.

Examples of plastic material suitable for use for the outer layer are all those materials conventionally used in the production of ribbed tubing, for example, polyvinyl chloride, polyethylene or polypropylene.

Materials suitable for use for the inner layer are: recycled materials, polyethylene (if polyethylene is also used for the outer skin, the polyethylene used for the inner skin may be of lower density), foamed plastic materials, especially those forming a continuous surface when exposed to air.

Although usually the layers will be of different materials, it is intended to include the possibility of the layers being of the same material. This may be the case when the rib structure is so massive that major difficulties with shrinkage might be encountered in attempting to form the tube in a single layer.

When foamed materials are used as the inner layer, it may be possible to use a third, innermost skin, which may be a skin rather than a structural wall or layer. Thus the innermost skin may be very thin and may not contribute to the strength of the tube. The purpose of this innermost skin would be to provide a smooth inner surface of the tube to protect the foam from liquids draining through the tube, or from friction with solid materials carried by the tube or from rubbing by electrical conduit.

Apparatus for forming tube according to the invention may be injection molding apparatus including a travelling mold tunnel having a mold surface comprising rib forming surfaces and trough forming ridges for an outer surface of the resulting tube, a plug having a surface adapted to mold an inner surface of the resulting tube, an extrusion nozzle comprising at least two coaxial, annular, channels for extrudate, an outer channel of which is adapted to carry extrudate for forming an outer structural skin of the tubing and which opens into the extrusion tunnel at an outer extrusion orifice adapted to direct extrudate against the mold face of the mold tunnel and into the recesses thereof, and an inner channel of which ends at an inner extrusion orifice substantially longitudinally coincident with the outer extrusion orifice and adapted to direct extrudate against an inner wall of an outer skin of the tubing formed against the mold face by extrudate form the outer extrusion orifice; and means for extruding inner and outer extrudate through the extrusion nozzle.

BRIEF DESCRIPTION OF THE DRAWINGS

Embodiments of the invention will now be described by way of example with reference to the accompanying drawings in which:

FIG. 2 shows a longitudinal section through two layered tube embodying the invention;

FIG. 3 shows a cross sectional view through the tube of FIG. 2;

FIGS. 5 and 6 show longitudinal and cross sectional views of three layered tube.

DETAILED DESCRIPTION OF THE PREFERRED EMBODIMENTS

Figure 1:
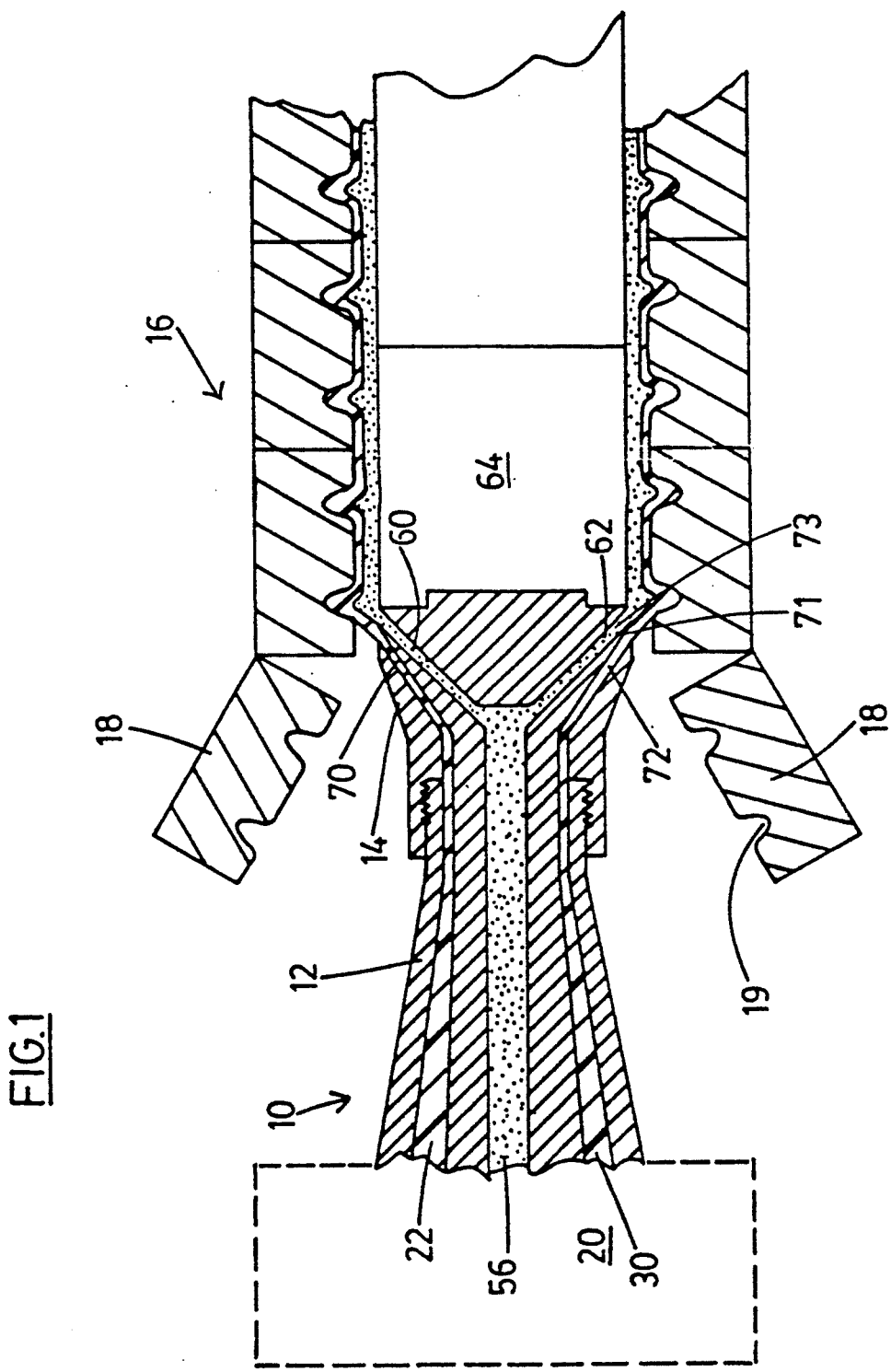
FIG. 1 is a sectional view through apparatus embodying the invention.

FIG. 1 shows a longitudinal section through a die assembly according to the invention. A nozzle 10 opens into travelling mold tunnel 16.

The elongate extrusion nozzle 10 comprises a first outer hollow cylindrical member 12 terminating at a free end in a die tip 14 having an outer annular exit channel 70 for extrusion passage 22 and an inner annular exit channel 60 for an extrusion passage 56. The exit channels 70 and 60 open into a mold space 66 between a travelling mold tunnel 16 and a plug 64.

The mold tunnel 16 is formed of cooperating pairs of mold blocks 18, each mold block 18 of a cooperating pair being one of an endless conveyor of mold blocks 18. The mold blocks 18 have mold faces which cooperate to form a tunnel having a mold surface with recesses 19 to mold tube having ribs 23, for example such as that shown in longitudinal and transverse sections in FIGS. 2 and 3.

In operation, an outer layer 72 issues from exit orifice 71 of outer, annular, exit channel 70 and an inner layer 62 issues concurrently from exit orifice 73 inner, annular, exit channel 60 from an extrusion head shown generally at 20. Exit orifices 71 and 73 are coaxial and coincident. Thus they are not spaced apart axially but issue into the mold tunnel together. The outer annular exit channel should be dimensioned and directed such that layer 72 is forced into recesses 19 of mold blocks 18 under extrusion pressure. The choice of the respective width and direction of outer exit channel 70 and grooves 19 of mold blocks 18 to form an outer corrugated skin rather than a ribbed skin will be a matter of choice for a man skilled in the art.

The considerations will be different depending upon the plastic material used and its viscosity. Its viscosity is dependent upon the temperature upon exiting nozzle 10 through outer exit channel 70 and upon temperature conditions at the mold face.

In any event, the plastic material for layer 72 may suitably be chosen to form a tough, hard outer skin of the resulting tube. Suitable materials are polyvinyl chloride and hard grades of polyethylene. Of course, for some purposes, it is envisaged that the outer skin need not be hard, and semi-rigid as will be apparent from the following discussion.

An inner filling layer 62 issues from inner exit channel 60 and is injected into cavities of the outer layer 72. Depending upon the constitution of layer 62, a two layer tube as shown in FIGS. 2 and 3 or a three layer tube as shown in FIGS. 5 and 6 may be formed. For example when inner layer 62 is foamed thermoplastic material it may be selected so that mid-layer 62 (see FIGS. 5 and 6) is foamed but foaming is lost from innermost layer 170 which forms a continuous inner thin skin. The dimension of innermost layer 170 may be proportionally much less than shown in FIGS. 5 and 6 in which it is shown of appreciable thickness for clarity. As may be seen from FIG. 2 and FIG. 5 the inner layer 62 or mid layer 162 may extend only partially into the ribs formed in grooves 19. Normal techniques used for the formation of ribbed tube may be used possibly including the use of an exit angle of more than 45° to aid injection into grooves 19 and possibly including the use of an accumulator chamber as claimed in co-pending U.S. Pat. No. 5,023,029 of the same inventor. However, due to the use of an outer skin, the inner filling layer formed from parison 62 may be formed of cheaper possibly recycled material than is suitable for the outer skin. Moreover, the inner filling layer may be chosen from extrudable thermoplastic materials according to the desired characteristics of the resulting tube. Thus, if soft, flexible tube is to be formed, a suitable choice of inner filling layer may achieve this.

Figure 4:
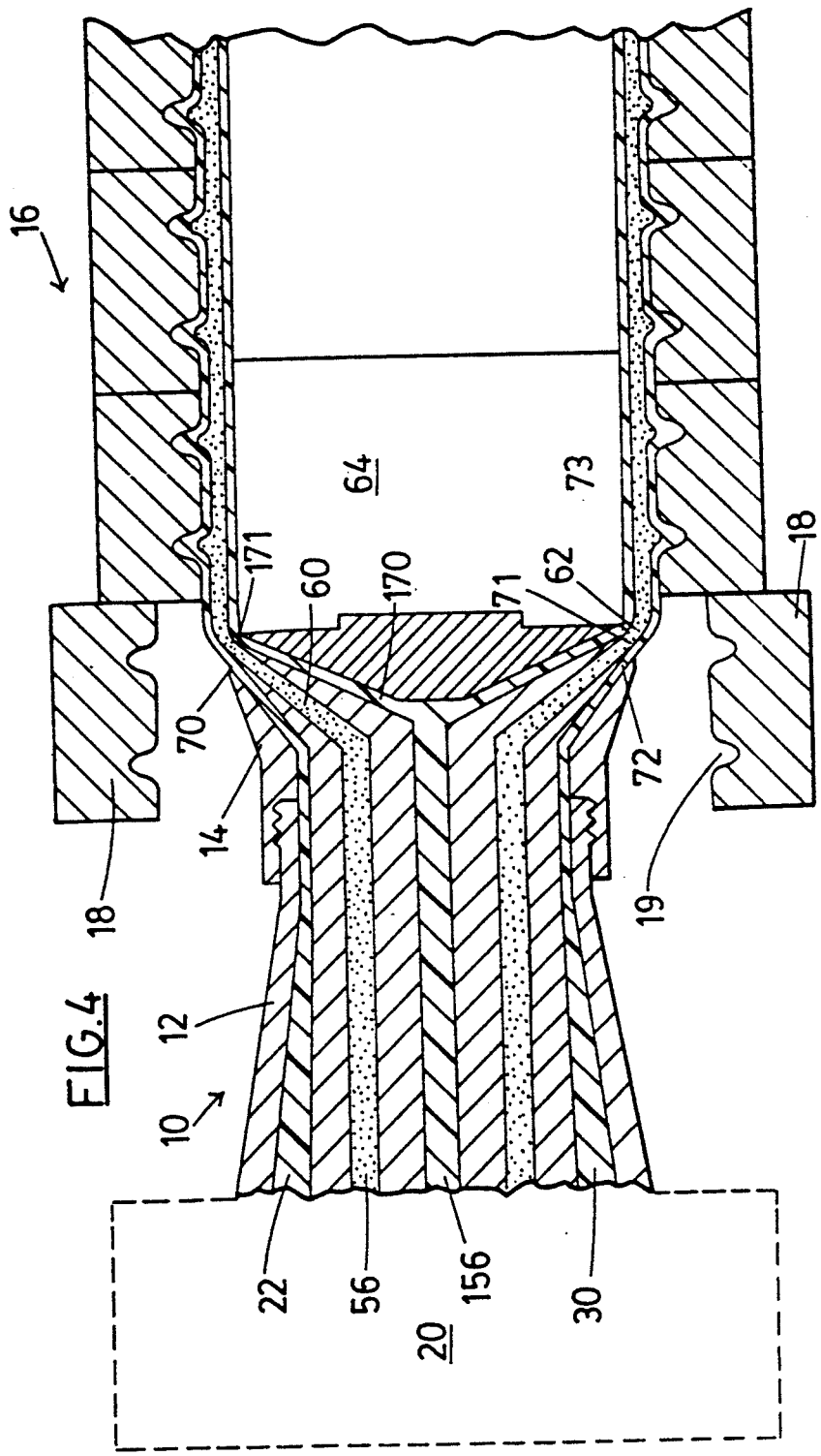
FIG. 4 shows a view comparative to that of FIG. 1 of apparatus for making three layer tube.

FIGS. 4, 5 and 6 are similar in most respects to comparative FIGS. 1, 2 and 3 but include an additional inner extrusion channel 170 having an exit orifice coincident with exit ports 71 and 73. Thus in this case three layer tube of three different extrudates may be produced.

Figure 7:
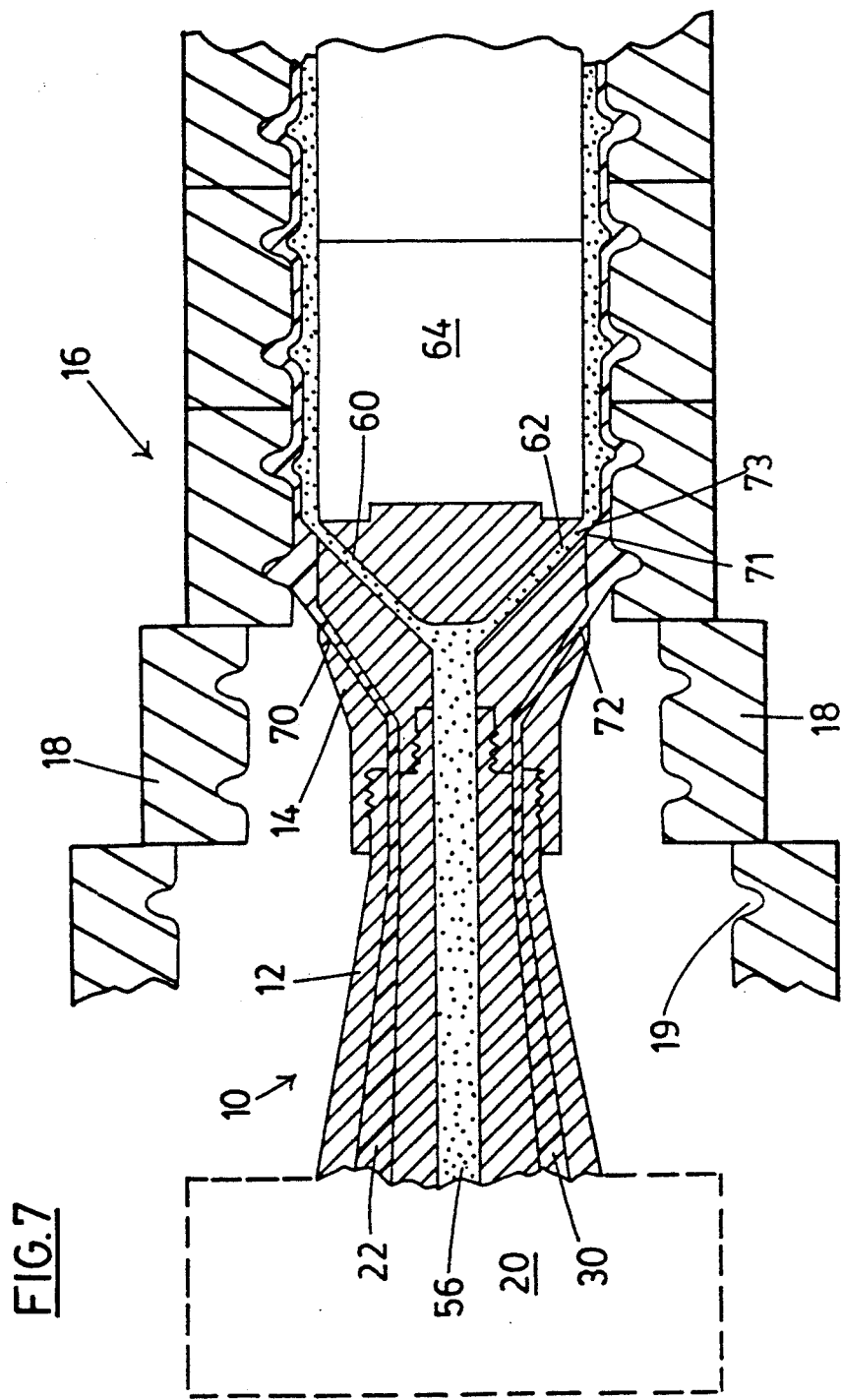
FIG. 7 is a sectional view through another apparatus having staggered exit ports for extruded layers.

FIG. 7 shows apparatus in which exit ports 71 and 73 are staggered. In this case the inner extruded layer 56 enters the mold tunnel downstream of exit port 71 for extrudate 22. Thus, extrudate 56 forces the outer layer more deeply into the troughs 19 to form a filling for the ribs.

I claim:

1. A multi-layer, semi-rigid, tube formed from a first thermoplastic having a selected density, said tube having a smooth inner surface and external structural ribs extending sharply around and projecting radially from the outer circumference of the tube, the ribs being spaced apart by a distance greater than the width of the ribs, and each rib comprising an outer layer of said first thermoplastic material and an inner layer of a second thermoplastic material, said second thermoplastic material having a density less than the selected density of said first thermoplastic.

2. A tube as claimed in claim 1 in which the outer layer comprises polyvinylchloride.

3. A tube as claimed in claim 1 in which the outer layer comprises polyethylene.

4. A tube as claimed in claim 1 in which the outer layer comprises polypropylene.

5. A tube as claimed in claim 1 in which the inner layer comprises a mid-layer and an innermost layer.

6. A tube as claimed in claim 1 in which the inner layer is recycled material.

7. A tube as claimed in claim 5 in which the mid-layer is foamed.

8. A tube according to claim 1 where the first thermoplastic is hard and the second thermoplastic is foamed.

* * * * *